United States Patent

Tsutsui et al.

[11] Patent Number: 5,836,852
[45] Date of Patent: Nov. 17, 1998

[54] CONTROL MECHANISM FOR AUTOMATIC TRANSMISSION

[75] Inventors: Hiroshi Tsutsui; Kazumasa Tsukamoto; Masahiro Hayabuchi; Takayuki Hisano; Nobutada Sugiura, all of Anjo, Japan

[73] Assignee: Aisin AW Co., Ltd., Anjo, Japan

[21] Appl. No.: 771,135

[22] Filed: Dec. 20, 1996

[30] Foreign Application Priority Data

Jun. 6, 1996 [JP] Japan ................................. 8-165102

[51] Int. Cl.$^6$ ........................................... F16H 61/04
[52] U.S. Cl. ........................ 477/118; 477/143; 477/144; 477/156
[58] Field of Search ..................... 477/117, 118, 477/130, 127, 143, 144, 156, 158, 174

[56] References Cited

U.S. PATENT DOCUMENTS

| 3,650,160 | 3/1972 | Higuchi et al. ........................ 477/118 |
| 3,714,836 | 2/1973 | Pierce, Jr. et al. .................. 477/118 X |
| 3,896,685 | 7/1975 | Shellman .............................. 477/143 X |
| 5,027,676 | 7/1991 | Fujiwara et al. .................... 477/156 X |

FOREIGN PATENT DOCUMENTS

A-4-302748 10/1992 Japan.

Primary Examiner—Khoi Q. Ta
Attorney, Agent, or Firm—Oliff & Berridge, PLC

[57] ABSTRACT

Uncomfortable travel of a vehicle due to engine brake actions during the travel of the vehicle in traffic is prevented without using an one-way clutch within a transmission mechanism. An automatic transmission is composed of rotational elements that are braked at the time of establishing low stages, a brake that brakes the rotational elements, and control systems which control the oil pressure of the hydraulic servo in the brake. A band brake that creates differences in application forces, using self-energizing and deenergizing actions, serves as the brake, which is set to have an area in which the oil pressure during the drive is lower than the oil pressure during the non-drive, by setting the self-energizing direction as a direction of rotation of the rotational element during the drive and the deenergizing direction as an opposite direction of rotation of the rotational element during the non-drive. The control systems have a supplying mechanism which supplies oil to the hydraulic servo of the band brake at an oil pressure that is lower than the oil pressure during the non-drive and is equal to or higher than the oil pressure during the drive.

6 Claims, 9 Drawing Sheets

|     | C-1 | C-2 | B-1 | B-2 | B-3 | B-R |
|-----|-----|-----|-----|-----|-----|-----|
| P   |     |     |     |     |     |     |
| REV | ○   |     |     |     |     | ○   |
| N   | ○   |     |     |     |     |     |
| 1ST | ○   | ○   |     |     | ○   |     |
| 2ND |     | ○   |     |     | ○   |     |
| 3RD | ○   | ○   |     |     |     |     |
| 4TH |     | ○   | ○   |     |     |     |
| 5TH |     | ○   |     | ○   |     |     |

FIG.3

CONTROL MECHANISM FOR AUTOMATIC TRANSMISSION

BACKGROUND OF THE INVENTION

1. Field of Invention

The invention relates to a control mechanism for an automatic transmission. In particular, the invention relates to a control mechanism which controls the operation of an engine brake during the running (traveling) of a vehicle.

2. Description of the Related Art

In an automatic transmission, to release the application between rotational elements from a state in which a specific rotational element in a transmission mechanism is braked to achieve low stages to hold, or maintain, reacting torque at the element for a purpose of achieving high stages, one-way clutches are generally used. However, an art in which an establishment of the one-way clutch is removed and which makes the transmission apparatus compact by directly controlling the application and the release of the above described rotational elements by adjusting oil pressure supplied to hydraulic servo using a frictional brake composed of wet-type multiple plates (discs)-is disclosed in JP Laid-Open Application 4-302748. In this art, an one-way clutch is positioned in a sub-transmission part; however, the clutch is prevented from being always free at a brake provided in parallel thereto.

When a vehicle travels in traffic, in case of a normal transmission apparatus in which the above described one-way clutch is provided, the one-way clutch becomes free because a direction of the reacting torque acted on the rotational element is reversed when a throttle is turned from on to off by the releasing, or backing off, of a step onto an accelerator (gas) pedal. That is, a state in which the wheels of the vehicle are driven by a motor force of the engine through the automatic transmission (such a state is called "drive" throughout the Specification) is changed to a coast state in which the engine is counter-driven by a driving force from the wheel side due to an inertial force from the vehicle through the automatic transmission (this is called "non-drive"). As a result, smooth travel of the vehicle without any discomfort is possible even if the drive state and the non-drive state are repeated due to repeatedly stepping on and backing off of the throttle, i.e., acceleration pedal.

On the other hand, as described in the above conventional art, in the case of the transmission using the frictional brake composed of multiple plates taken in place of the one-way clutch, because automatic engagement and releasing operations of the brake in response to reverse rotations in a direction of the reverse force torque applied on the rotational element do not occur, engine brake actions occur every time when the state changes from the drive state to the non-drive state due to the turning on and off of the throttle by means of the accelerator peddle operation during the travel of the vehicle in traffic. Therefore, the travel becomes uncomfortable when acceleration and deceleration are often switched.

SUMMARY OF THE INVENTION

It is a first object of the invention to provide a control mechanism for an automatic transmission which can prevent the vehicle from uncomfortably traveling due to the above described engine brake operations during the time of the non-drive state, while employing a structure that does not use the one-way clutch in order to make the mechanism compact.

It is a second object of the invention that, in the control mechanism, a selection to have the engine brake operations occur is also possible.

It is a third object of the invention that the engine brake operations can be selectively caused to occur in accordance with need based on the traveling state of the vehicle.

It is a fourth object of the invention that determinations of the necessity for the engine brake operations are properly accomplished in accordance with the traveling state of the vehicle.

Then, it is a fifth object of the invention that the engine brake operations accurately occur when the engine brake operations are determined necessary based on the determinations of necessity of the operations.

To achieve the first object, the invention introduces a control mechanism for the automatic transmission comprising a control system which controls the oil pressure of a hydraulic servo of a brake in an transmission composed of a rotational element braked for establishing low stages, and the brake brakes the rotational element, wherein the brake comprises a band brake which creates differences in application forces using a self-energizing action and a deenergizing action, the band brake set to have an area in which the oil pressure during the drive is lower than the oil pressure during the non-drive, by setting the self-energizing direction a direction of rotation of the rotational element during the drive and the deenergizing direction a direction of rotation of the rotational element during the non-drive, and the control mechanism has a supplying means for supplying, to a hydraulic servo of the band brake, oil pressure that is lower than the oil pressure during the non-drive and equal to or higher than the oil pressure during the drive.

To achieve the second object, the supplying means are able to selectively supply the oil pressure during the non-drive or the oil pressure that is lower than the oil pressure during the non-drive and equal to or higher than the oil pressure during the drive.

To achieve the third object, the control system includes determination means for determining the need to establish an engine brake for the vehicle, and the supplying means supplies the oil pressure during the non-drive to the hydraulic servo of the band brake when it is determined by the determination means that the establishment of the engine brake is necessary, and supplies the hydraulic servo with the oil pressure that is lower than the oil pressure during the non-drive and equal to or higher than the oil pressure during the drive when it is determined that the establishment of the engine brake is unnecessary.

To achieve the fourth object, the determination means determines that the establishment of the engine brake is necessary when the vehicle is traveling in traffic, when it is not traveling on a downhill road, and when it is not traveling at a high speed.

To achieve the fifth object, the control system has an input torque detection means for detecting input torque and vehicle speed detection means for detecting the speed of the vehicle, the oil pressure during the drive and the oil pressure during the non-drive are calculated based on signals from the input torque detection means and the vehicle speed detection means, and when it is determined by the determination means that the establishment of the engine brake is necessary, higher oil pressure between the calculated oil pressure during the drive and oil pressure during the non-drive is supplied to the hydraulic servo, and when it is determined that the establishment of the engine brake is not necessary, the oil pressure during the drive is supplied to the hydraulic servo.

In a structure directed to achieving the first object, the hydraulic pressure which is applied to the hydraulic servo during de-energizing must be higher than the hydraulic pressure which is applied to the hydraulic servo during self-energizing when braking the rotational element with the same braking force of the band brake. In other words, the band brake is set so that a direction of rotation in which the self-energizing action occurs is a direction of rotation of the rotational element during the drive and the other direction of rotation in which the de-energizing action occurs is a direction of rotation of the rotational element during the non-drive. Just then, the band brake is set so that there is an area in which the hydraulic pressure for braking the rotational element during the drive is lower than the hydraulic pressure for braking the rotational element during the non-drive. By applying to the hydraulic servo a hydraulic pressure that is lower than the hydraulic pressure for braking the rotational element during the non-drive and equal to or higher than the hydraulic pressure for braking the rotational element during the drive, the band brake brakes the rotational element using the hydraulic pressure applied to the hydraulic servo and the self-energizing action to establish a predetermined gear stage during the drive, and when changing to the non-drive in which the throttle is turned off from on, the band brake cannot brake the rotational element for the de-energizing action, cannot maintain the predetermined gear stage, and the engine brake does not work. Therefore, uncomfortable travel of the vehicle can be avoided.

In the structure directed to achieving the second object, since a selective supply of the oil pressure during the non-brake is also possible, even if the band brake enters the deenergizing state due to the turning off of the throttle, by supply of the non-drive oil pressure, the application of the band brake is maintained and, thus, control to create the engine brake actions is possible in response to the necessity.

In addition, in the structure directed to achieving the third object, because the determination means is provided to determine the necessity for the engine brake actions, based on that determination, a control that automatically creates the engine brake operations is executed when the engine brake is necessary.

Next, in the structure directed to achieving the fourth object, the determination of the need for the engine brake actions by the determination means is properly accomplished in accordance with the traveling state of the vehicle, mainly traveling in traffic, and thus a appropriate release control of the engine actions can also be achieved.

Finally, in the structure directed to achieving the fifth object, the hydraulic pressure during the non-drive is increased linearly in accordance with an increase in the vehicle speed because the traveling load of the vehicle during non-drive is in linear proportion to the increase in the vehicle speed. However, the rate of increase of the hydraulic pressure during the drive must be increased corresponding to the increase of the vehicle speed and related effects because the traveling load of the vehicle during drive has a portion that is in proportion to the input torque and a portion that corresponds to the air resistance that increases quadratically corresponding to the increase of the vehicle speed. Therefore, depending on the setting of the band brake, in the high vehicle speed area, the hydraulic pressure during the drive becomes higher than the hydraulic pressure during the non-drive. When the engine brake is needed, by applying higher hydraulic pressure among the hydraulic pressure during the non-drive and the hydraulic pressure during the drive, the engine brake can be obtained certainly. In addition, even if the engine brake is always applied when the throttle is released, in the high vehicle speed area as described above, since the engine brake is always necessary in the high vehicle speed area, the original effects of the invention will not be missed.

BRIEF DESCRIPTION OF THE DRAWINGS

The invention will be described with reference to the figures in which:

FIG. 3 is an operational chart of the above automatic transmission;

DETAILED DESCRIPTION OF PREFERRED EMBODIMENT

Figure 2:
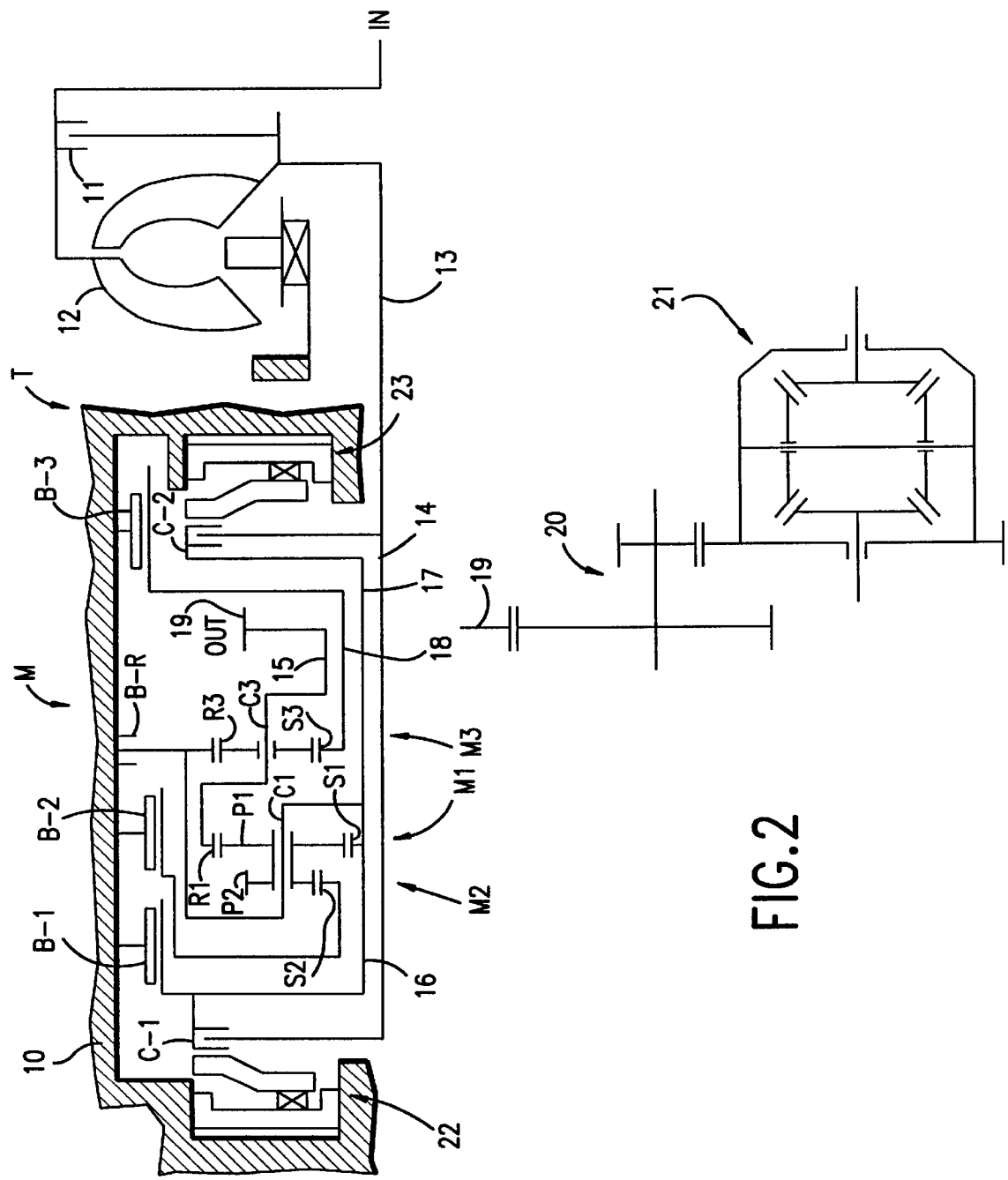
FIG. 2 is a schematic diagram showing a mechanism of a transfer device including the automatic transmission to which the invention is adopted.

An embodiment of the invention will be described using the attached drawings. FIG. 2 schematically shows a transfer device having a horizontally placed structure in which a differential device is combined into an automatic transmission to which the control mechanism of the invention is applied. The device comprises a torque converter 12 with a lockup clutch connected to an engine of the vehicle, an automatic transmission T composed of a transmission mechanism M having three planetary gear sets M1, M2 and M3 which transmit an output of the torque converter 12 into five forward (drive) speeds and one backward (reverse) speed, and a differential device 21 which is connected through a counter gear 20 that is also operated as a low speed mechanism, and which transfers the transferred output of the automatic transmission T to the right and left wheels of the vehicle.

Pinion gears P1 and P2, that have different diameters, of both gear sets M1 and M2 of the transmission mechanism M in the automatic transmission T are directly connected. Ring gears R1 and R3 of the gear sets M1 and M3 are connected to carriers C3 and C1, respectively. A sun gear S1 and the carrier C1 of the gear set M1 are connected, as input elements, to an input shaft 14 connected to a turbine shaft 13 of a torque converter 12 through respective clutches C-1, C-2. In addition, the respectively connected ring gear R1 and carrier C3 are connected to an output gear 19, operating as an output element, through an output shaft 15. Moreover, the sun gear S1 of the gear set M1 can be braked to a transmission case 10 by a brake B-1, and the sun gear S2 of the gear set M2 can be braked to the transmission case 10 by a brake B-2. The sun gear S3 of the gear set M3 can be braked to the transmission case 10 as well by a brake B-3, and the ring gear R3, connected to the carrier C1, can be braked to the transmission case 10 by a brake B-R.

The sun gear S1 is connected to the clutch C-1 via a sun gear shaft 16 which fits on the outer surface of an input shaft 14. The carrier C1 is connected to a clutch C-2 via a carrier shaft 17 which fits on the outer surface of the input shaft 14. The sun gear S3 is connected to the brake B-3 via a sun gear shaft 18 which fits on the outer surface of the carrier shaft 17. Moreover, in this embodiment, hydraulic servos 22, 23 of the clutches C-1, C-2 have shapes of a stationary cylinder positioned in the transmission case 10. Each brake, except the brake B-R, has a band brake structure. The brake B-R has a multiple plate type brake structure. Drawings for the hydraulic servos are omitted. An output gear 19, used as an output element, is connected to the differential device 21 via a counter gear 20.

Figure 3:
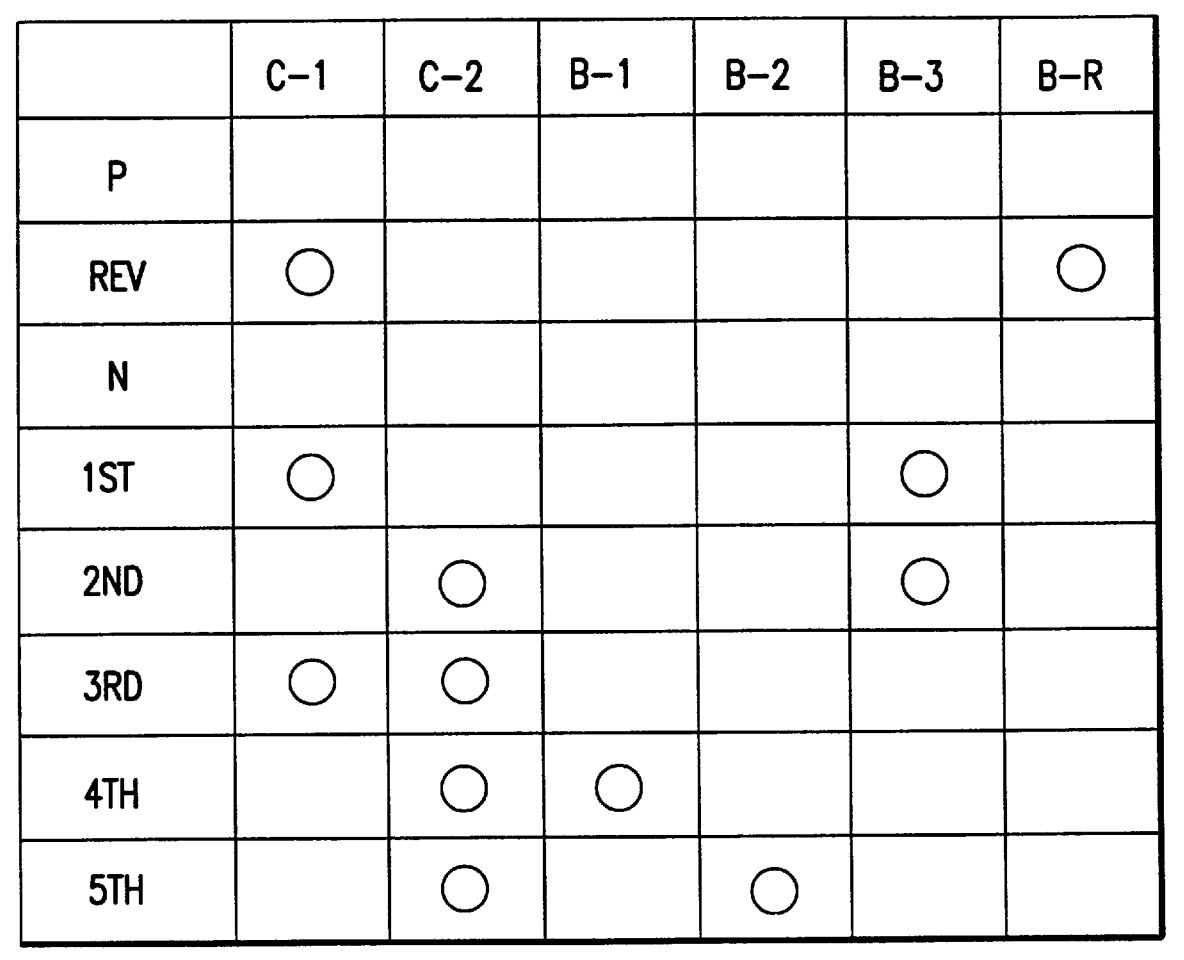

As shown in FIG. 3, under the control of the electronic control system and the hydraulic control system, which will be described with reference to FIG. 1 later, the automatic transmission T thus structured supplies oil pressure to the hydraulic servo corresponding to individual clutches and brakes, to apply, as indicated by the circles, and release, as indicated by the blanks, the individual clutches and brakes to thereby establish the individual gear stages.

That is, the first ($1^{st}$) speed range is achieved by engaging the clutch C-1 and the brake B-3. At this time, input during the drive is transmitted from the input shaft 14 to the sun gear S1 through the clutch C-1 and is output to the output gear 19 as a rotation of the carrier C3 which is decelerated most by the braking of the sun gear S3 by the brake B-3. In this stage, the rotation of the output gear 19, during the non-drive, is transmitted to the engine side through the carrier C3, ring gear R1, sun gear S1 and clutch C-1 due to the reaction caused by the braking of the sun gear S3 by engaging the brake B-3. However, when releasing the brake B-3, since the reaction does not occur the sun gear S3 is released, the pinion gear P1 rotates irrelevantly, or harmlessly, i.e, has no effect, with respect to the rotation of the ring gear R1, and thus the driven torque is not transferred.

Similarly, the second ($2^{nd}$) speed range is achieved by engaging the clutch C-2 and the brake B-3. At this time, the input, transmitted to the carrier shaft 17 through the clutch C-2, is transmitted as is to the ring gear R3 through the carrier C1 and is output to the output gear 19 as the differential rotation of the carrier C3, which serves as a reaction element reacting to the braking of the sun gear S3 by the brake B-3. In this case, the rotation of the output gear 19 during the non-drive is also transmitted to the engine side through the carrier C3, ring gear R1, carrier C1 and clutch C-2 due to the reaction caused by the braking of the sun gear S3 by engaging the brake B-3. However, when releasing the brake B-3, since the reaction does not occur the sun gear S3 is released, the pinion gear P1 rotates irrelevantly, or harmlessly, i.e., has no effect, with respect to the rotation of the ring gear R1, and thus the driven torque is not transferred.

The third ($3^{rd}$) speed range is established by the direct connection of the planetary gear set M1 as a result of the application of both clutches C-1, C-2. At this stage the rotation of the input shaft 14 is output as is, as the rotation of the carrier C3 to the output gear 19. The fourth ($4^{th}$) speed range and above of this transmission operates as an overdrive. The fourth ($4^{th}$) speed range is established with the application of the clutch C-2 and the application of the brake B-1 that brakes the sun gear S1. At this stage, the rotation of the input shaft 14 is transmitted to the output gear 19 from the carrier C3 as the rotation of the ring gear R1 which was accelerated the revolution of the pinion gear P2 with respect to the rotation of the carrier C1.

On the other hand, the fifth ($5^{th}$) speed range is established by the application of the clutch C-2 and the application of the brake B-2. At this stage, the rotation of the input shaft 14 is transmitted to the output gear 19 from the carrier C3 as the rotation of the ring gear R1 which is additionally accelerated by the revolution of the small-diameter pinion gear P2 reacting the sun gear S2 having a larger diameter, than at the time of the establishment of the fourth ($4^{th}$) speed. Moreover, reverse (REV) is established when the clutch C-1 and the brake B-R are applied. At this stage, with respect to the input to the sun gear S1 through the clutch C-1, the rotation of the carrier Cl is stopped by the braking of the ring gear R3 to the case 10 due to the application of the brake B-R, and the reverse rotation of the ring gear R1, which is decelerated by the revolution of the pinion gear P1, is output from the output gear 19 through the carrier C3.

In the automatic transmission T thus structured, in the invention, as described above, the sun gear S3 is the rotational element which is braked for the establishment of the low stages, and the brake which is applied to the sun gear S3 is the brake B-3. Then, the control system that controls the oil pressure to the hydraulic servo of the brake B-3 is structured of a circuit within the hydraulic control system, shown in FIG. 1, and a program in the electronic control system 6 that controls the circuit with electric signals.

Figure 1:
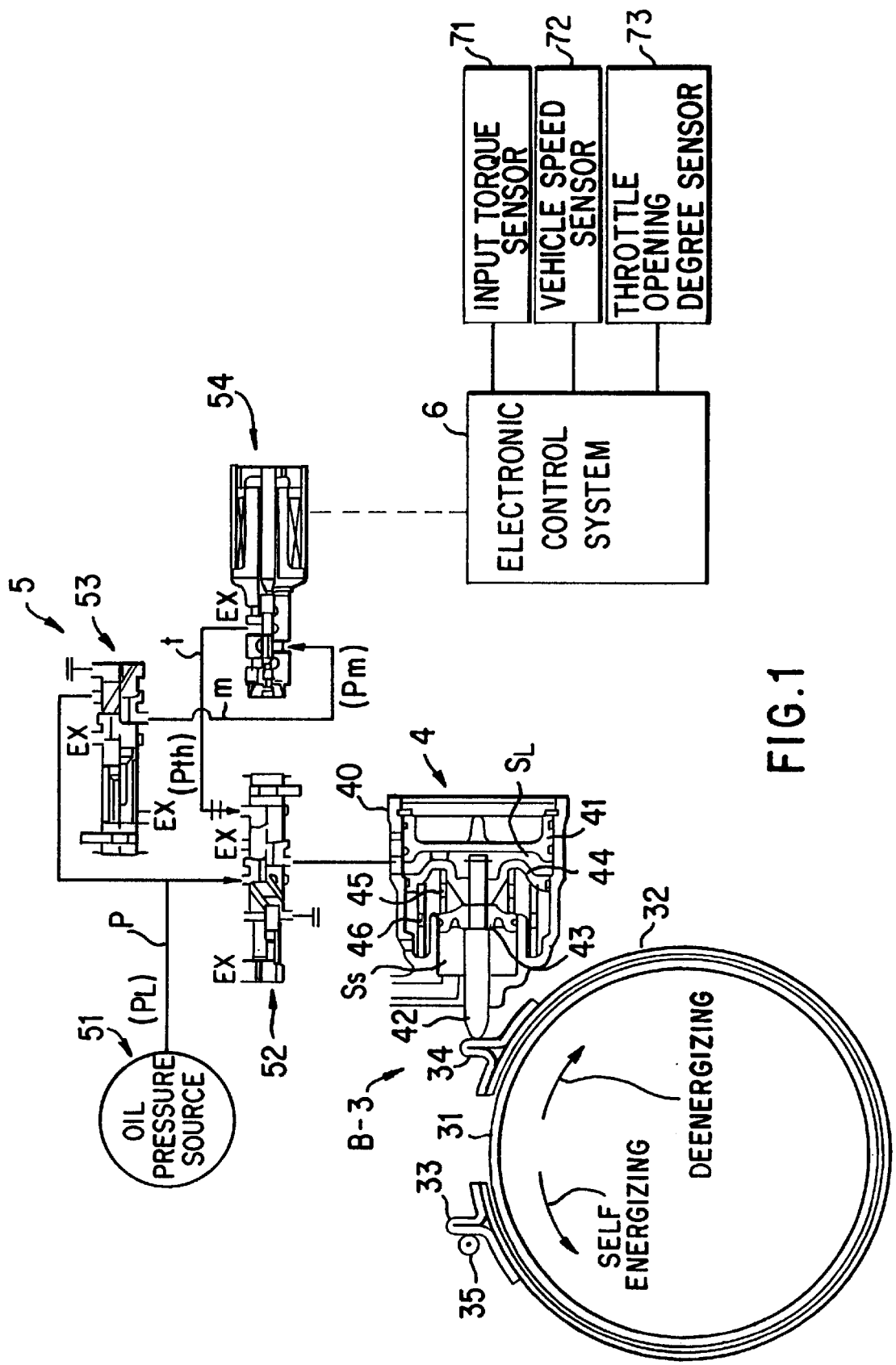
FIG. 1 is a schematic diagram showing, in a partial block, an embodiment of the control mechanism of the automatic transmission of the invention.

As shown in FIG. 1 in detail, the brake B-3 comprises a drum 31, a band 32, and a hydraulic servo 4. The drum 31 is connected to the sun gear S3 through a sun gear shaft 18 as shown in FIG. 2. The band 32 has brackets 33, 34 at each end at the outer periphery of the drum 31. The anchor side bracket 33 is attached to an anchor pin 35 which is fixed to the case 10. The other bracket 34, on the pressure application side, is attached to the end of a piston rod 42 of the hydraulic servo 4. The elasticity of the band 32 forces the bracket 34, and piston rod 42, in a direction for opening, i.e., towards the hydraulic servo 4. Because of the characteristics of the mechanism of the brake B-3, at the time of (the closure of, i.e., contraction of the band 32) braking, when the drum 31 receives counterclockwise torque as shown in the figure, friction resulting from the application of i.e., tightening, the band 32 to the drum 31 acts on the band 32 in a direction to further tighten the band. Therefore, a self-energizing (referred to as self energy hereafter) occurs which increases the brake application forces. On the other hand, when the drum 31 receives a clockwise torque, the friction resulting from the application of the band 32 to the drum 31 acts as a force for softening i.e., releasing, the braking effect of the band as it acts in the direction opposite to the force tightening the band. Thus, a de-energizing (referred to as deenergy hereafter) occurs which reduces the brake application forces. As a result, differences in the application of forces to the band brake B-3 result from the direction of reacting torque applied on the sun gear S3.

The hydraulic servo 4 of the brake B-3 has a servo cylinder 40 having cylinder bores $S_L$, $S_S$ that have different diameters; a large piston 44 installed to be freely slideable in the large bore $S_L$; a small piston 43 installed to be freely slideable in the small bore $S_S$; a rod 42 passes through both pistons 43, 44 and is always seated against or in contact with the small piston 43; a separator spring 45 and a return spring 46, both springs 45, 46 formed from compressed coil springs having different diameters, and a lid 41 covering an opening in the end of the large bore $S_L$. The rod 42, fixed against the small piston 43, slidably protrudes through an end wall on the small bore $S_S$ side of the servo cylinder 40 and is attached to the bracket 34 of the band 32. The large piston 44 is slideably retained by the rod 42. Between the small piston 43 and the large piston 44, the separator spring 45, having a small diameter, i.e., a smaller diameter than the return spring 46, is positioned based on a predetermined load setting. The return spring, having a large diameter, is positioned between the end wall of the servo cylinder 40 and the large piston 44, based on a predetermined load setting.

The hydraulic control system 5 for controlling the hydraulic servo 4 includes a hydraulic oil pressure source 51 for the line pressure $P_L$ that has a pump as the main body, a B-3 control valve 52 which is connected to the hydraulic oil pressure source 51 through a line pressure oil passage p and adjusts the line pressure $P_L$ to supply to the hydraulic servo 4, a solenoid modulator valve 53 connected to the line pressure oil passage p which modulates the line pressure $P_L$ and outputs to a modulator pressure oil passage m as a modulator pressure $P_m$, and a linear valve 54 which applies a throttle pressure $P_{th}$ based on the modulator pressure modulated by the solenoid modulator valve 53 to the B-3 control valve 52 through a throttle pressure oil passage t.

The electronic control system 6 which controls the linear solenoid valve 54 is connected to the solenoid of the linear solenoid valve 54 and to an input torque sensor 71, vehicle speed -sensor 72 and accelerator opening degree sensor 71 which serve as input means. The input torque sensor 71 is used for setting application pressures and determining downhill roads, the vehicle speed sensor 72 is used for setting the application pressures, determining downhill roads, vehicle speed, and trafficed roads, and the accelerator opening degree sensor 73 is used for determining trafficed roads, i.e., a road with considerable stop and go driving.

In keeping with the main object of the invention, the band brake B-3 is set to have areas in which the oil pressure required for braking the rotational element during the drive of the vehicle is lower than the oil pressure required for braking the ring gear R3 during the non-drive of the vehicle.

Figure 4:
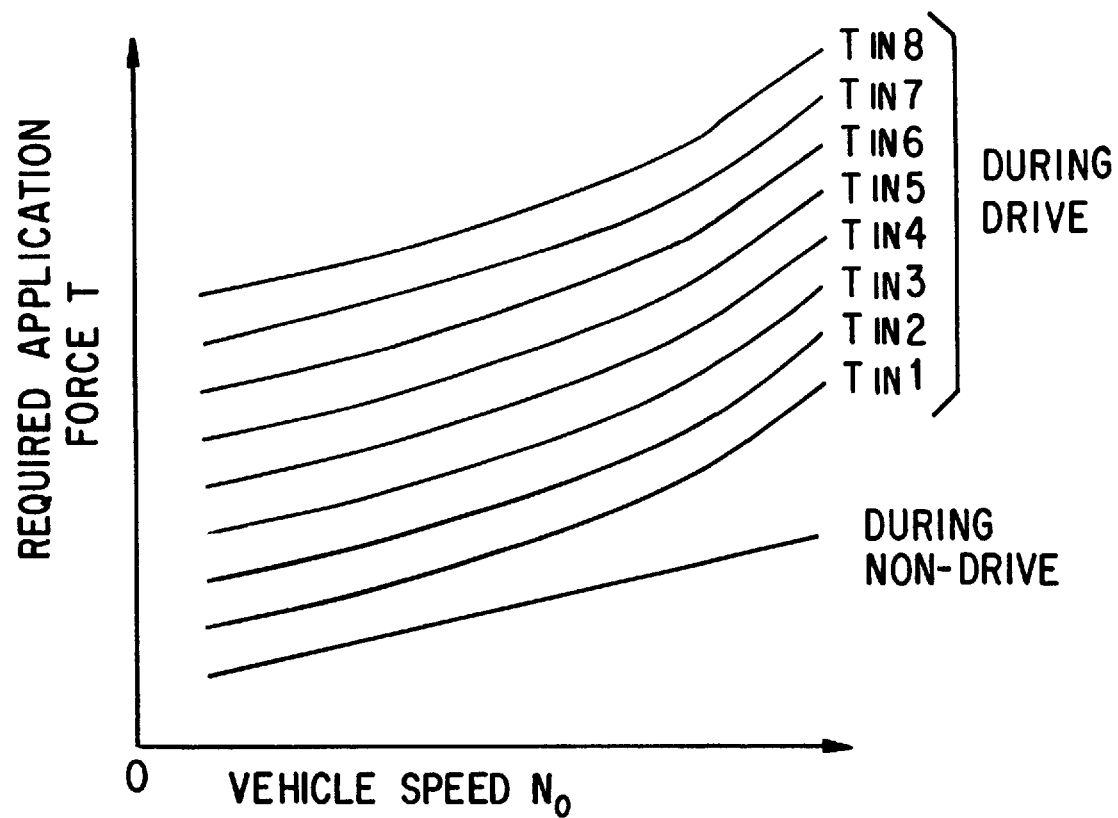
FIG. 4 is a graph characterizing the application force required for application to the brakes of the automatic transmission.

Such settings are described with reference to FIGS. 4 and 5. As shown in FIG. 4, a required application force, or torque, T for maintaining the application of the brake B-3 during the drive is represented, with the input torque $T_{IN}$ as a parameter, as quadratic curves in which an increase ratio becomes larger as the speed of the vehicle $N_0$ increases. A reason why the characteristics of the application force form such quadratic curves is that the drive torque required for maintaining the speed of the vehicle against running loads (loads generated from running) receives the effects of the load provided by air resistance which increases quadratically along with the increase in the speed of the vehicle. On the other hand, the required application force T of the brake B-3 during the non-drive has a linear shape which linearly increases as the speed of the vehicle $N_0$ increases.

Figure 5:
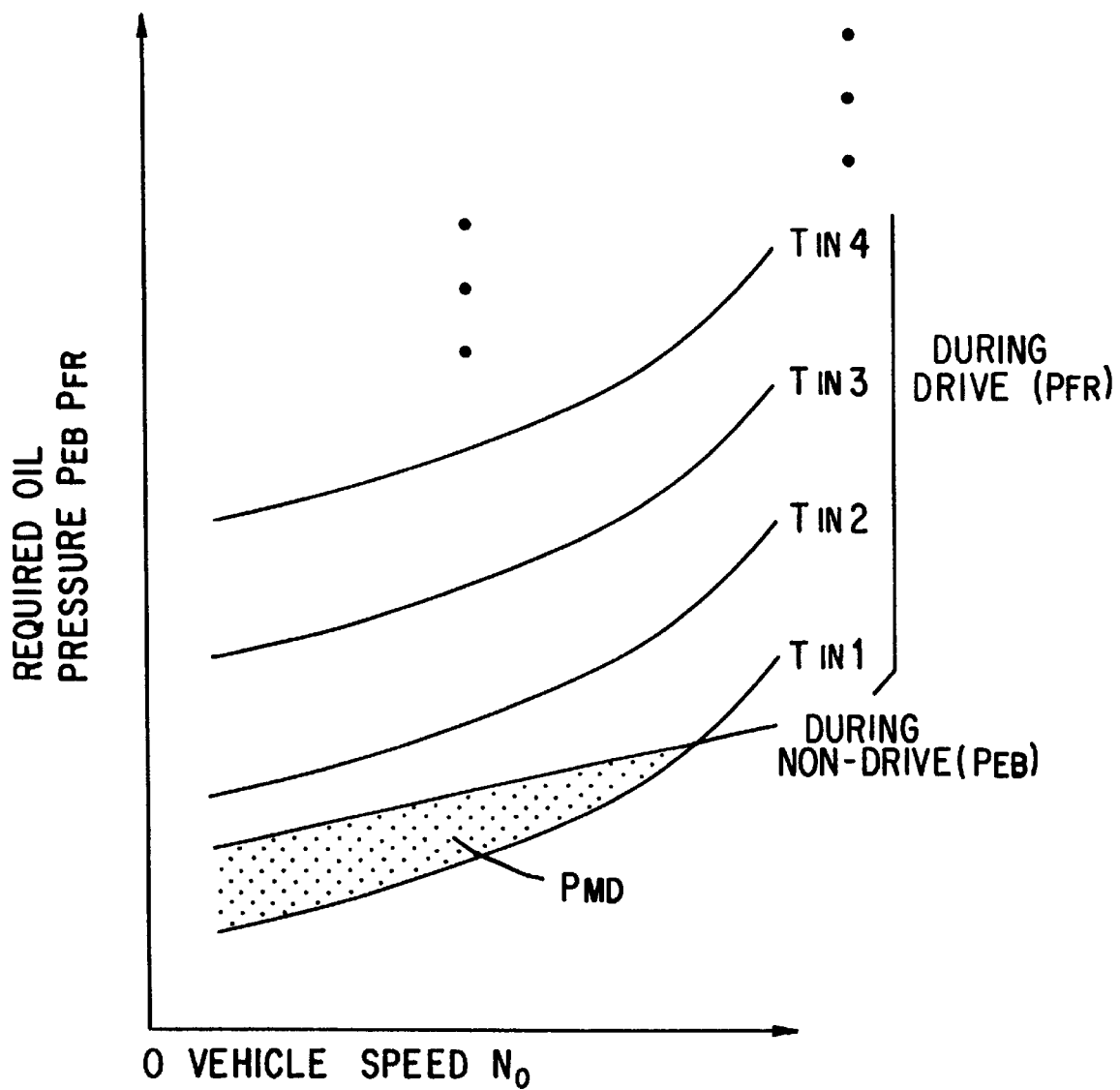
FIG. 5 is a graph characterizing the oil pressure required for application to the hydraulic servo of the automatic transmission.

Therefore, as shown in FIG. 5, required oil pressures $P_{FR}$ applied to the brake B-3 during the drive, which is supplied to the hydraulic servo is, in the same manner as the case of the above applied forces, represented, in quadratic curves in which the increase ratio becomes larger as the speed of the vehicle $N_0$ increases. On the other hand, the required oil pressure $P_{EB}$ of the brake B-3 during the non-drive has a linear shape which linearly increases as the speed of the vehicle $N_0$ increases. Therefore, because of the difference in frictional application forces between self-energy and deenergy, even during the drive in which higher application forces are required than during the non-drive, as shown in FIG. 4, a condition of the application of braking force during the drive can be achieved with lower oil pressures than during the non-drive (shaded area of FIG. 5). In addition, in FIGS. 4 and 5, the input torque value $T_{IN}1$, which is 0 or a small value with which the vehicle maintains speed, corresponds to the time when the vehicle is traveling in traffic. Thus, when the input torque is $T_{IN}1$, a shaded area in the FIG. 5, more specifically, the area $P_{MD}$ in which the required oil pressure $P_{EB}$ during the non-drive is not included, and the required oil pressure $P_{FR}$ during the drive is included, setting the brake in which the application is maintained during the drive, the application is released in the non-drive, and thus it is possible not to cause the engine brake actions during the non-drive, i.e., $P_{FR} \leq$ the area $\leq P_{EB}$.

Therefore, according to the above setting, until the speed of the vehicle exceeds a certain point, the engine brake actions do not occur, only during the non-drive, by means of supplying, to the hydraulic servo 4 of the band brake (B-3), oil pressures which are lower than the oil pressure during the non-drive, and equal to or higher than the oil pressure during the drive. However, when the speed of the vehicle exceeds the certain point, the oil pressure during the drive is higher than the oil pressure during the non-drive. In the present embodiment, the higher of the oil pressure during the drive or the oil pressure during the non-drive is supplied to the hydraulic servo 4 of the band brake B-3 when the vehicle is travelling in traffic. In this way, of course, the engine brake actions cannot be released in the area in which the speed of the vehicle exceeds the certain point. However, because the release of the engine brake actions are not necessary in such high-vehicle-speed areas, the controls which are the object of the invention are present.

Figure 6:
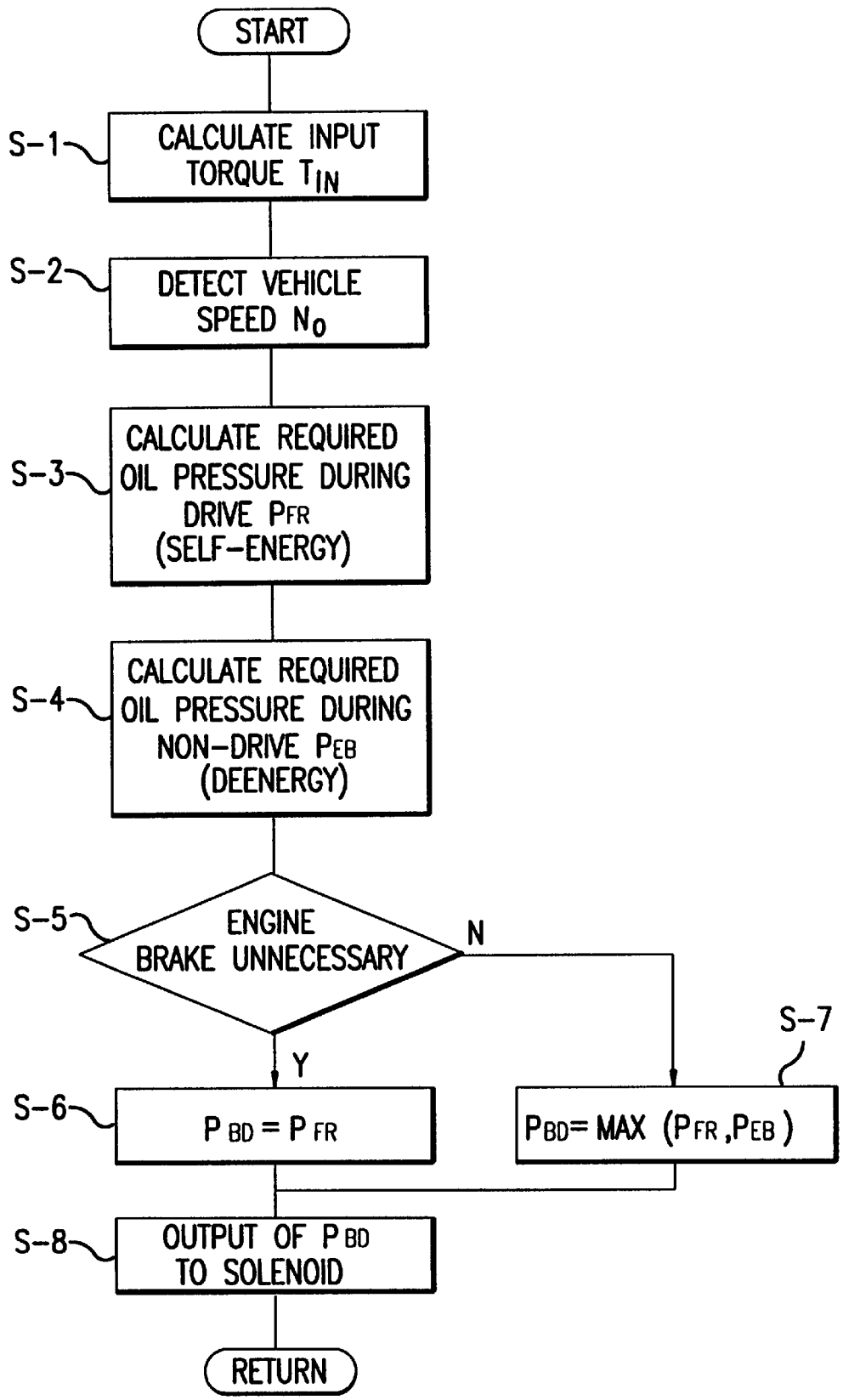
FIG. 6 is a flowchart showing a control process of the control system.

FIG. 6 is a flowchart of a hydraulic control process of the electronic control system 6. First, in step S-1, the input torque $T_{IN}$ is calculated based on a detected value of the input torque sensor 71, and the vehicle speed $N_0$ is detected from the vehicle speed sensor 72 in step S-2. Next, the required oil pressure $P_{FR}$ during the drive is computed in step S-3 and the required oil pressure $P_{EB}$ during the non-drive is computed in step S-4 based on the input torque $T_{IN}$ and the vehicle speed $N_0$. Then, the need to brake the engine brake is determined in step S-5. If the determination is yes (Y), i.e., it is not necessary to brake the engine brake, the oil pressure $P_{FR}$ required for maintaining the application during the drive is set as the servo oil pressure $P_{BD}$ in step S-6. If the determination is no (N), i.e. it is necessary to brake the engine, the higher oil pressure MAX ($P_{FR}$, $P_{EB}$) between the required oil pressure ($P_{FR}$) during the drive and the required oil pressure ($P_{EB}$) during the non-drive computed in steps S-3 and S-4, respectively, is set as the brake B-3 servo oil pressure $P_{BD}$. Then, a corresponding duty signal value is output to the solenoid of the linear solenoid valve 54 in step S-8, so that a pressure adjustment output from the B-3 control valve 54 becomes the servo oil pressure $P_{BD}$.

With this process, in the hydraulic circuit shown in FIG. 1, the throttle pressure $P_{th}$ is applied to a spool end of the B-3 control valve 52 as a result of the pressure adjustment operations of the linear solenoid valve 54 having the modulator pressure Pm as the standard, or base, pressure. Then, the pressure adjustment operation of the B-3 control valve 52 occurs which adjusts the line pressure $P_L$ to the servo oil pressure $P_{BD}$. Thus, the standard servo pressure $P_{BD}$ is supplied to the large bore $S_L$ of the hydraulic servo 4. Because the rod 42 is pushed out by the movement of the large piston 44 against the small piston 43, due to the supply of the oil pressure, the front end of the rod 42 pushes the bracket 34 to tighten the band 32, one end being held by the anchor pin 35, onto the drum 31. Then, when a reacting torque is applied to the drum 31, with the band in the closing condition, in the direction of the self-energy, the rotation of the drum 31 caused by the reacting torque is stopped by the further tightened band. On the other hand, when the reacting torque is applied in the direction of deenergy and the band 32 is tightening, the rotation of the drum 31 caused by the reacting torque may be stopped if the oil pressure P applied to the band 32 through hydraulic servo 4 is sufficient. However, when the required oil pressure $P_{FR}$ during the drive is selected, the rotation of the drum 31 is not stopped as the oil pressure $P_{FR}$ does not overcome the band 32 loosening effect of the rotating drum 32. However, at high vehicle speeds, i.e., when not travelling in traffic or stop and go conditions, when the required application force is reversed, i.e., the hydraulic pressure $P_{FR}$ is applied rather than the hydraulic pressure $P_{EB}$, the rotation of drum 31 is stopped even when the required oil pressure ($P_{FR}$) during the drive is selected.

Figure 7:
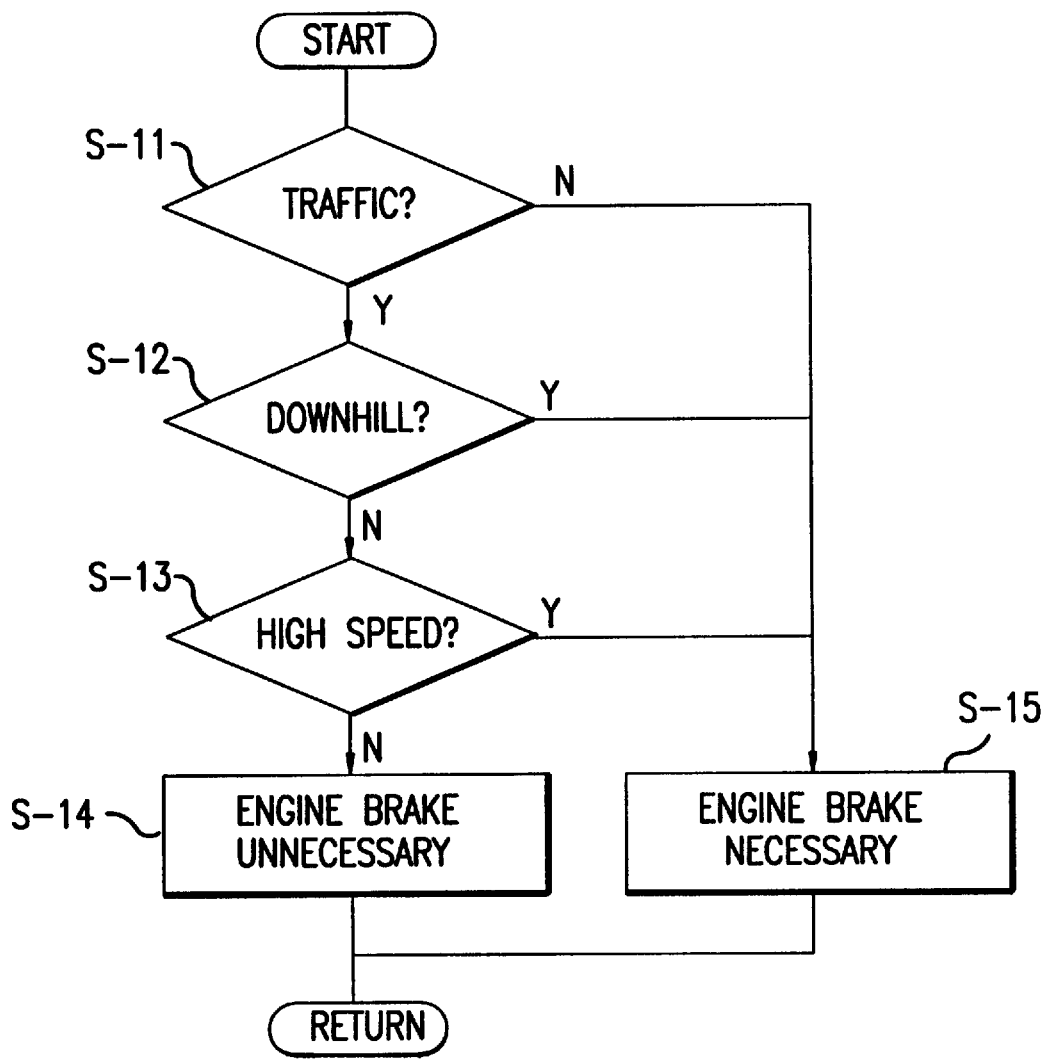
FIG. 7 is a flowchart showing a traffic determination process in the control process.

FIG. 7 is a flowchart of a routine for determining the need for the engine brake. In this process, a determination of traffic, a determination of a downhill road, and a determination of high vehicle speed are accomplished in steps S-11, S-12 and S-13, respectively. After the three determinations, when the determinations conclude the vehicle is traveling in traffic, i.e. is in stop and go conditions, it is not traveling on a downhill road, and that it is not traveling at a high speed, a judgment is made in step S-14 that the establishment of the engine brake is not necessary. On the other hand, if the opposite of any of the determinations is made, that is, the vehicle is not in traffic, is on a downhill road, and/or is travelling at a high speed, the judgment in step S-15 is that the establishment of the engine brake is necessary.

In the above determination of traffic conditions, because it is assumed the driver feels uncomfortable, or most uncomfortable only when traveling in traffic, the engine brake is defined as unnecessary in such conditions. The determination of travel in traffic is accomplished based upon the control of the accelerator peddle detected by the throttle opening degree sensor 73, a tendency of the vehicle speed detected by the vehicle speed sensor 72 (i.e., frequency of the vehicle stopping), and the like. In addition, even in traffic, the establishment of the engine brake is necessary if on a downhill road. The determination of downhill roads is accomplished by a comparison between the ideal acceleration, on a flat road, to be obtained from the input torque ($T_{IN}$) detected at the input torque sensor 71, shown in FIG. 1, and the actual acceleration of the vehicle. Further, for the determination of high vehicle speed, because generally a vehicle does not travel at high speed in traffic, particularly stop and go traffic, to prevent the occurrence of free running when the speed temporarily becomes high and the establishment of the engine brake is required, the current vehicle speed is detected by the vehicle speed sensor 72, shown in FIG. 1, and a determination is made whether it is higher than a specified value, e.g. 40 km/hr.

Figure 8:
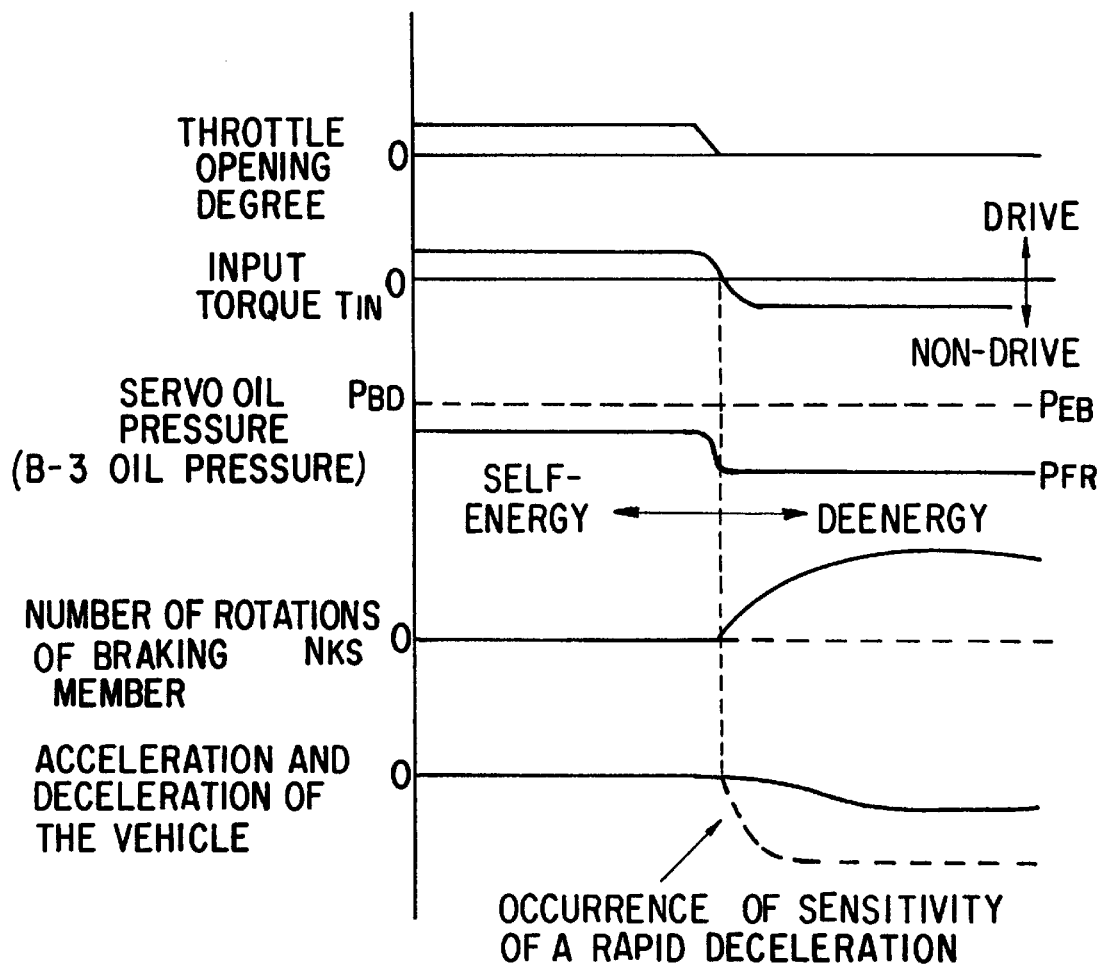
FIG. 8 is a time chart during the turning off of the throttle during the travel in traffic for the first speed of the automatic transmission.

FIG. 8 is a time chart during a throttle off movement in traffic at the establishment of the first ($1^{st}$) speed range. In this case, when the throttle opening degree becomes 0, the input torque $T_{IN}$ becomes a negative non-drive. The servo oil pressure $P_{BD}$ is maintained at a value $P_{EB}$ indicated by a dotted line when the engine brake is required, and is changed from a high value $P_{FR}$ which is the self-energy to a low value which is the deenergy as indicated by a solid line in the figure. In accordance with the oil pressure, the number of rotations of the application element, that is, the brake B-3, is maintained at 0 meaning the brake is applied on holding, indicated by a dotted line when the engine brake is required, and is increased to a number of rotations in the release state (number of rotations of the sun gear S3), indicated by a solid line, when the engine brake is not required. Moreover, the acceleration and deceleration of the vehicle rapidly changes to a constant value, indicated by the dotted line, at which the driver feels a large deceleration. However, when the engine brake is not required, the acceleration and deceleration smoothly change to a level so that the vehicle occupants do not uncomfortably feel the braking.

Figure 9:
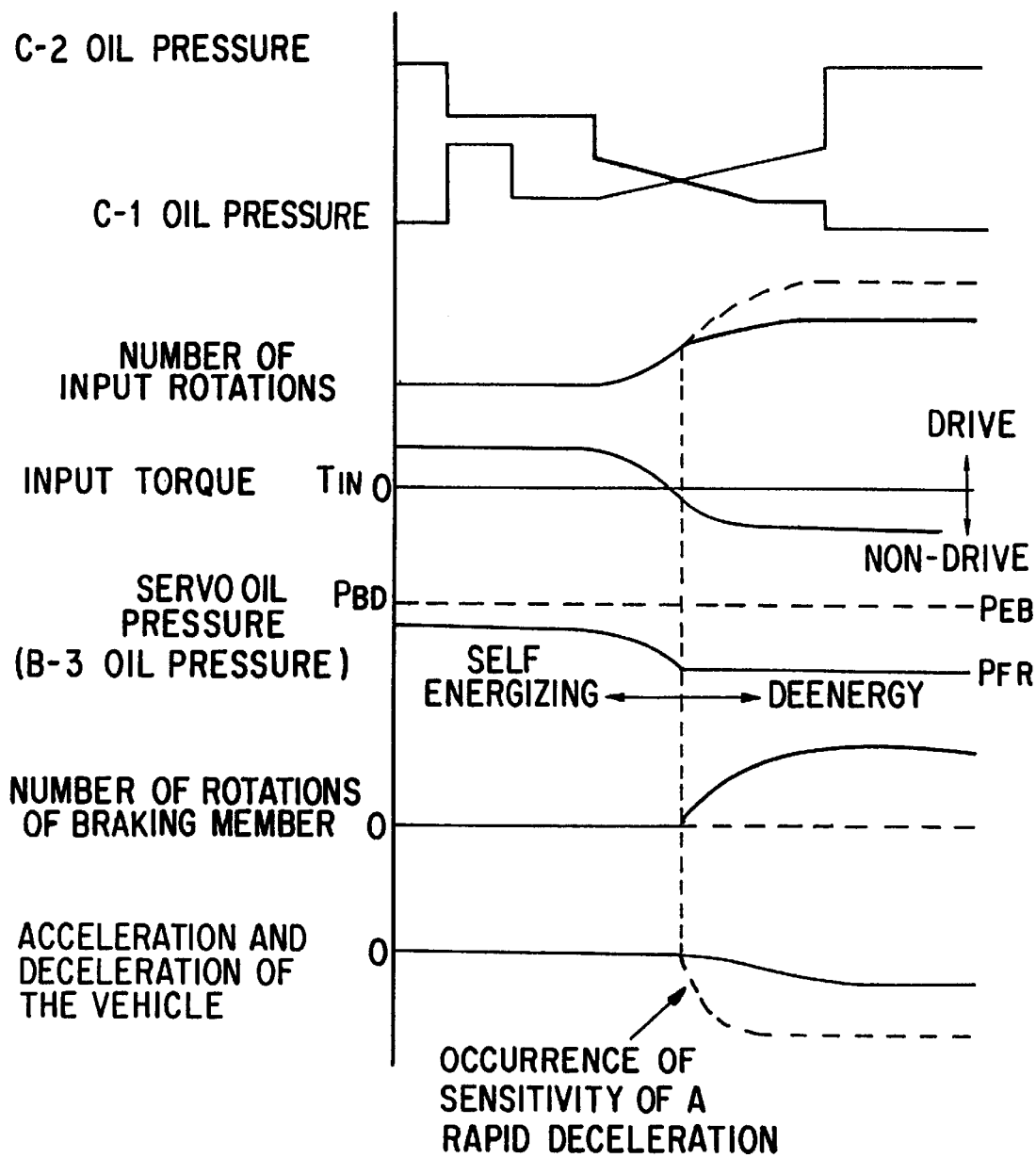
FIG. 9 is a time chart at the time of downshifting from $2^{nd}$ to $1^{st}$ during travel in traffic by the automatic transmission.

FIG. 9 is a time chart of downshifting from the second ($2^{nd}$) speed range to the first ($1^{st}$) speed range ($2 \rightarrow 1$) during the travel in traffic. In this case, a control of the C-2 oil pressure and the C-1 oil pressure is executed for switching the two input clutches C-1, C-2, and in accordance with the moving torque between the two clutches causing the number of input rotations corresponding to the first ($1^{st}$) speed range to increase. The increase in the rotation in this case increases more during the action of the engine brake, indicated by the dotted line, than during the non-action of the engine brake indicated by the solid line. In addition, the number of rotations of the input torque $T_{IN}$, servo oil pressure $P_{BD}$, meshing member (i.e., sun gear S3) and the acceleration and deceleration of the vehicle are the same as the characteristics during the above throttle off and, thus, are omitted.

As described above, according the control mechanism of the above embodiment, when the sun gear S3 is braked with the same braking force, more oil pressure is required in the direction of deenergy than in the direction of the self-energy. Using this, by setting the direction of self-energy during the drive and the direction of deenergy during the non-drive, the result is there is an area in which the oil pressure during the drive, which is required for braking the sun gear S3 during the drive, is lower than the oil pressure required for braking the sun gear S3 during the non-drive. Therefore, if an oil pressure $P_{MD}$ that is lower than the oil pressure during the non-drive but equal to or higher than the oil pressure during the drive is supplied to the hydraulic servo 4, the band brake B-3 brakes the sun gear S3 by the self-energy and, thus, the establishment of the first ($1^{st}$) speed range and the second ($2^{nd}$) speed range is possible. In addition, when the drive condition is changed to the non-drive by the throttle being turned from on to off, the sun gear S3 is not braked since the application of the band brake B-3 changes the direction during the deenergy. Therefore, the first ($1^{st}$) speed range or the second ($2^{nd}$) speed range cannot be maintained, and the engine brake does not act.

On the other hand, in case in which the oil pressure during the non-drive is supplied, even if the band brake B-3 applies in the direction of the deenergy due to the throttle being turned off, the application of the band brake is maintained, and the engine brake can be applied if necessary. Then, the need to use the engine brake is determined by the determination means. Because the determination is made that the engine brake is unnecessary when the vehicle is traveling in traffic, is not on a downhill, and is not travelling at high speed, the engine brake acts when the vehicle travels downhill or temporarily at high speed even in traffic and, thus, the occurrence of free traveling can be prevented.

Further, by supplying the higher oil pressure of the oil pressure for the non-drive and the oil pressure for the drive, the engine brake can be accurately applied even if the relationship between the oil pressure during the non-drive and the oil pressure during the drive reverse at high vehicle speeds.

The invention was described based on the embodiment. However, the invention can be practiced within the scope of the invention, by changing the details of the structure as would occur to one skilled in the art upon reading this disclosure.

What is claimed is:

1. A control mechanism for an automatic transmission, comprising:

a control system which controls the oil pressure of a hydraulic servo of a brake in a transmission composed of a rotational element braked for establishing low stages, and the brake brakes the rotational element, wherein:

the brake comprises a band brake which creates differences in application forces using a self-energizing action and a deenergizing action;

the band brake configured such that an oil pressure during an engine drive condition is lower than the oil pressure during the an engine non-drive condition, by setting the self-energizing direction a direction of rotation of the rotational element during the drive and the deenergizing direction another direction of rotation of the rotational element during the non-drive; and the control system has a supplying means for supplying, to a hydraulic servo of the band brake, oil pressure that is lower than the oil pressure during the non-drive and equal to or higher than the oil pressure during the drive.

2. The control mechanism for the automatic transmission claimed in claim 1, wherein said supplying means are able to selectively supply the oil pressure during the non-drive or the oil pressure that is lower than the oil pressure during the non-drive and is equal to or higher than the oil pressure during the drive.

3. The control mechanism for the automatic transmission claimed in claim 2, wherein the control system includes determination means for determining necessity of establishment of an engine brake for the vehicle; and the supplying means supplies the oil pressure during the non-drive to the hydraulic servo of the band brake when it is determined by the determination means that the establishment of the engine brake is necessary, and supplies the hydraulic servo with the oil pressure that is lower than the oil pressure during the non-drive and equal to or higher than the oil pressure during the drive when it is determined that the establishment of the engine brake is unnecessary.

4. The control mechanism for the automatic transmission claimed in claim 3, wherein the determination means determines that the establishment of the engine brake is unnecessary when the vehicle is traveling in traffic, when it is not traveling on a downhill road, and when it is not traveling above a predeterm speed.

5. The control mechanism for the automatic transmission claimed in claim 3, wherein said control system has an input torque detection means for detecting input torque, and vehicle speed detection means for detecting the speed of the vehicle, the oil pressure during the drive and the oil pressure during the non-drive are calculated based on signals from the input torque detection means and the vehicle speed detection means, and when it is determined by the determination means that the establishment of the engine brake is necessary, higher oil pressure between the calculated oil pressure during the drive and oil pressure during the non-drive is supplied to the hydraulic servo, and when it is determined that the establishment of the engine brake is not necessary, the oil pressure during the drive is supplied to the hydraulic servo.

6. The control mechanism for the automatic transmission claimed in claim 4, wherein said control system has an input torque detection means for detecting input torque, and vehicle speed detection means for detecting the speed of the vehicle, the oil pressure during the drive and the oil pressure during the non-drive are calculated based on signals from the input torque detection means and the vehicle speed detection means, and when it is determined by the determination means that the establishment of the engine brake is necessary, higher oil pressure between the calculated oil pressure during the drive and oil pressure during the non-drive is supplied to the hydraulic servo, and when it is determined that the establishment of the engine brake is not necessary, the oil pressure during the drive is supplied to the hydraulic servo.

* * * * *